United States Patent [19]

Govin et al.

[11] Patent Number: 4,909,353

[45] Date of Patent: Mar. 20, 1990

[54] TREE STAND

[75] Inventors: Charles T. Govin, Elm Grove; William M. Haselton, New Berlin; Robert J. Konruff, Milwaukee; Thomas G. Bray, South Milwaukee, all of Wis.

[73] Assignee: Total Shooting Systems, Inc., Fond du Lac, Wis.

[21] Appl. No.: 309,191

[22] Filed: Feb. 13, 1989

[51] Int. Cl.⁴ .................... A01M 31/02; A45F 3/26
[52] U.S. Cl. .................................... 182/187; 182/134
[58] Field of Search ................ 182/187, 188, 134; 248/421, 423, 277; 108/152

[56] References Cited

U.S. PATENT DOCUMENTS

| 3,022,037 | 2/1962 | Stallard | 248/421 |
| 4,722,421 | 2/1988 | Hilbert | 182/187 |

Primary Examiner—Alvin C. Chin-Shue
Attorney, Agent, or Firm—Arnold J. Ericsen; C. Thomas Sylke

[57] ABSTRACT

A tree stand support platform assembly including a flexible strap or band for embracing a supporting upright and front and rear band supporting legs at opposite sides of the platform movable from and to a collapsed transport position to a raised operating position. The legs are each pivotally attached to the platform and pivotally joined to one another at their respective free inner ends. There is further provided improved means for detachably retaining slidable end portions of the flexible bands at the intermediate pivot connection of the front and rear legs with the use of an axially movable knob stem threadingly engageable with a slidable slotted retainer, and inside bracket on the platform for slidably retaining one of said legs relative to the platform.

4 Claims, 2 Drawing Sheets

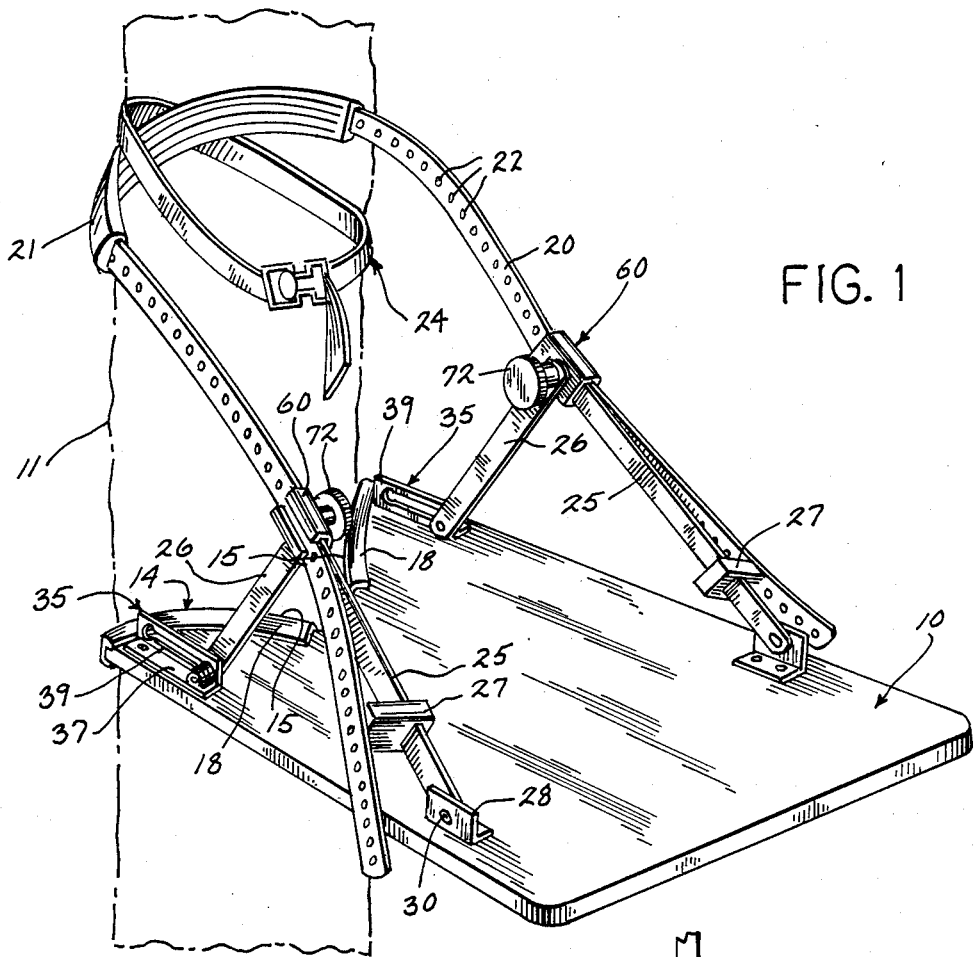
FIG. 1
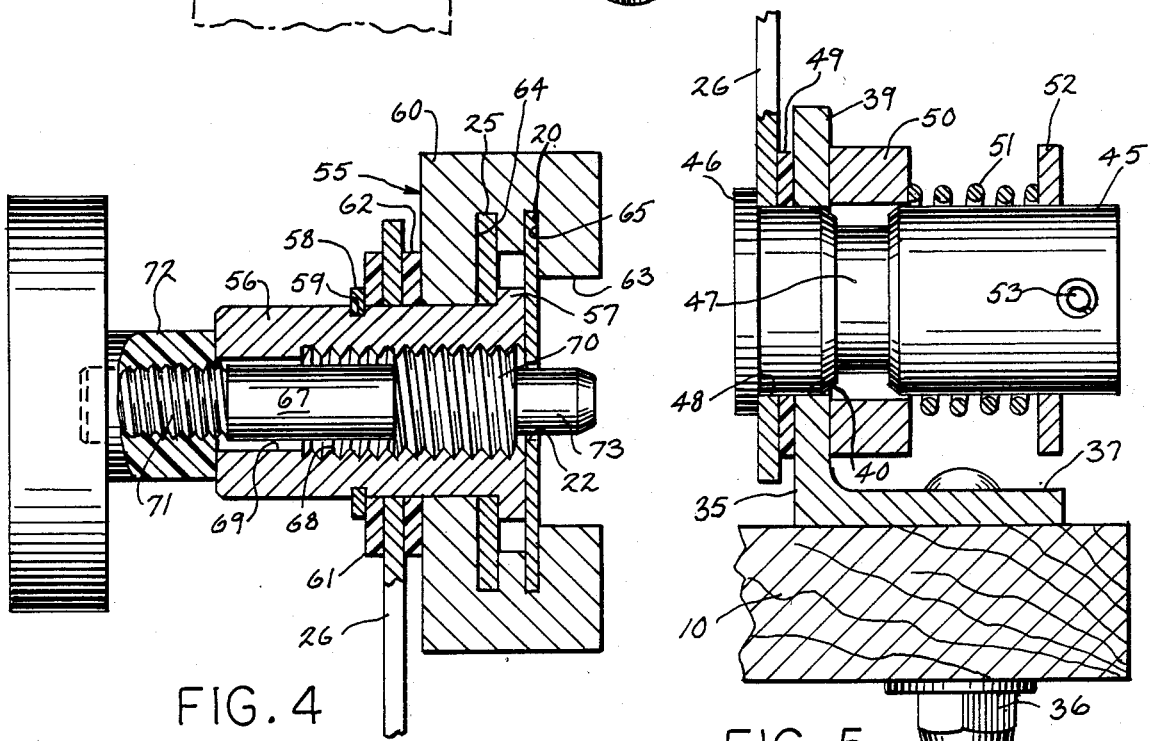
FIG. 4
FIG. 5

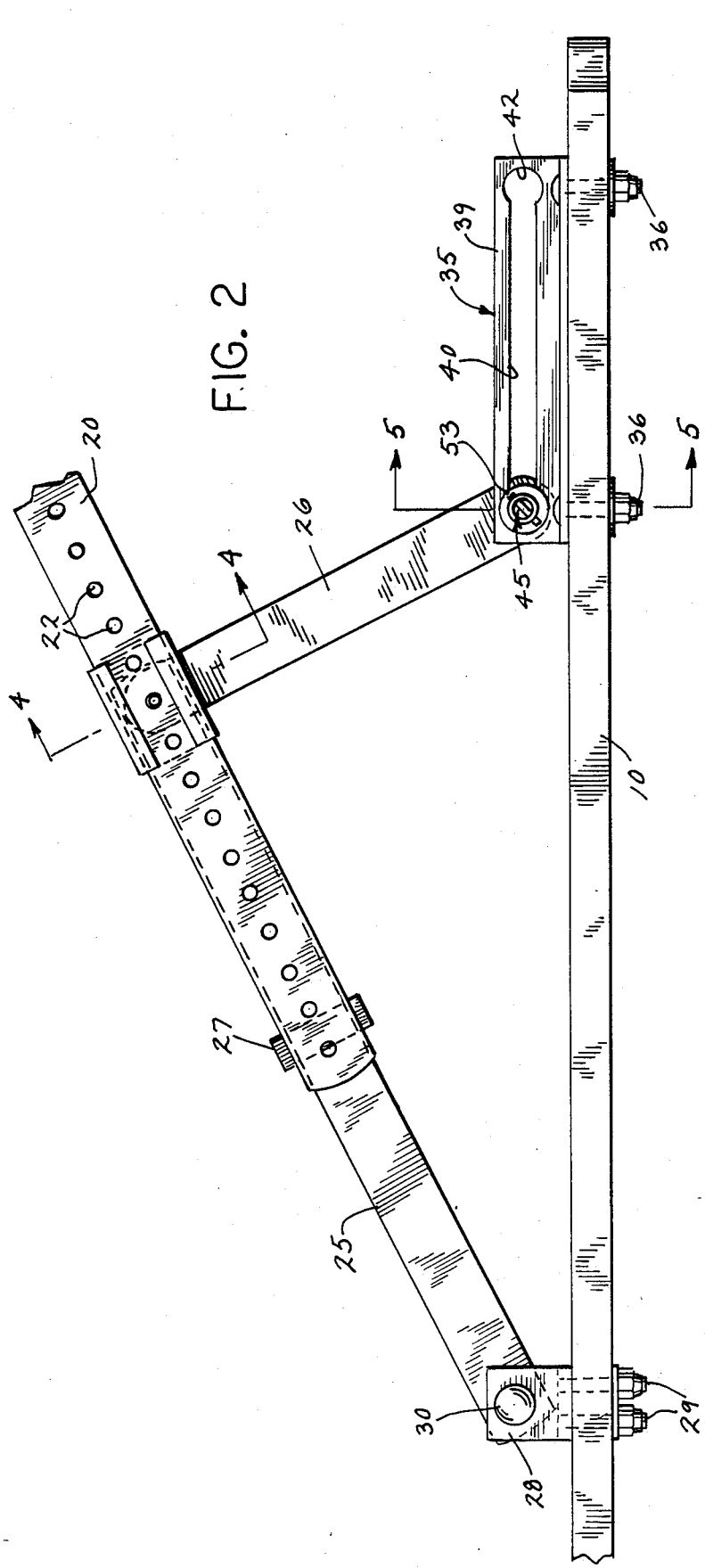
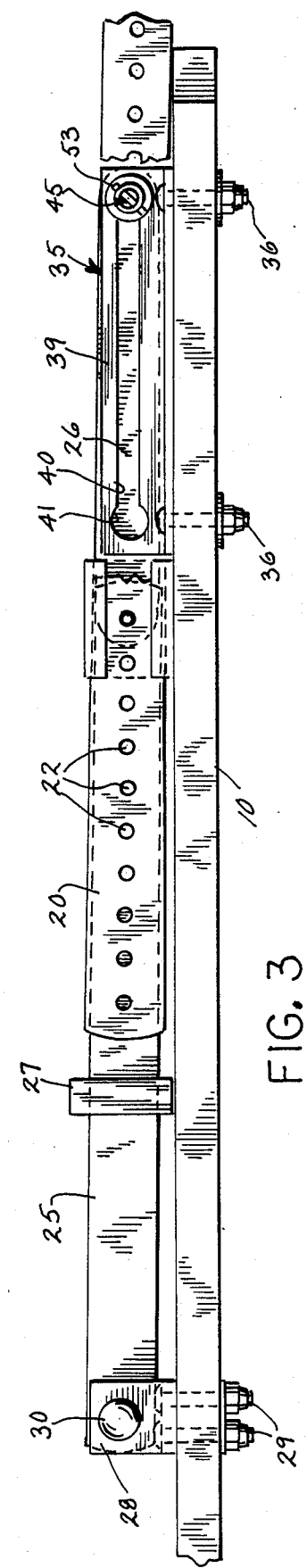
FIG. 2
FIG. 3

TREE STAND

BACKGROUND OF THE INVENTION

1. Field of the Invention

The invention relates to a platform which may be in the form of a conventionally known tree stand used by hunters, photographers and naturalists to obtain a high viewing position. As is typical of these stands, there is provided a platform supported on an upright member such as a tree or a utility pole. The platform defines a notch located at the rear of the platform adapted to engagably receive the upright member. There is also provided a flexible metal band encircling the upright member and supporting the platform. At each side of the platform there is means are provided for engaging the metal band and also to adjust the band to accommodate the periphery of the upright member and maintain the platform at a substantially horizontal position, with the band being positioned at an angle extending upwardly and rearwardly from the platform.

2. Description of the Prior Art

Platforms of this type have been disclosed in U.S. Pat. Nos. 4,428,459 and No. 4,597,473 each respectively issued to Paul L. Peck. Other patents include U.S. Pat. No. 4,427,092 issued to Lynn A. Tentler and U.S. Pat. No. 4,722,421 issued to Thomas F. Hilbert and assigned to the same assignee as the present invention.

The preferred embodiment of the invention utilizes various elements cooperating to provide a construction similar to U.S. Pat. Nos. 4,428,459 and No. 4,597,473, and to further provide additional adjustment and stabilization features. The improved construction is relatively free of rattle and noise, both during transportation to a desired location and also during its use. In a device of this nature it is imperative to minimize factors creating audible disturbances which would act to keep animals from approaching the platform during use and transportation thereto.

SUMMARY OF THE INVENTION

A principal object of this invention is to provide a tree stand with increased stability and ease in adjustment of the stand relative to the supporting upright member.

It is also a very important object to provide a simple mechanism for adjusting the supporting band encircling the upright member and for locking the band support arms in a desired attitude to hold the band at a desired angle relative to the platform. Also, when collapsed for transportation, the components are maintained in a transport latch position for retention of the various cooperating elements and thereby minimize relative motion between the elements which might otherwise act to create squeaks or rattles or other noise factors during transportation and during installation and use.

The objects of the invention are accomplished in the preferred embodiment by providing oppositely disposed, stationarily mounted, slotted slide brackets having enlarged openings at at least one end thereof for receiving a slide adjustment pin having an enlarged integral shoulder portion adapted to be seated in an enlargement located at an end of an elongated slot of the respective slide brackets. In this state the tree stand may be transported with its adjustment arms collapsed for transportation. The slide adjustment pin is biased towards locking engagement of the enlarged shoulder with the enlargement of the slot, to permit the pin to slide longitudinally and which is releasable by manual axial pressure for raising angularly adjustable support arms. The support arms are pivotally connected with one another, and also are pivotally connect to the platform. The improved intermediate pivot connection has been simplified over prior art adjustment means in the provision of a strap adjustment pin with a reduced stem end portion adapted to be received in a selected aperture of a plurality of longitudinally spaced apertures formed inwardly of the distal ends of the flexible strap engaging the upright member. The aperture-engaging stem end portion of the strap adjustment pin projects form an intermediate enlarged threaded portion seated within an elongated bushing member having a flanged outer end. The bushing guide defines spaced apart longitudinal slots for respectively receiving the flexible band and one of the adjustable pivoted legs. The flanged outer end normally abuts the inner wall of the band guide. The bushing also receives at its reduced portion the rear leg of the adjusting legs to provide the intermediate pivot connection for the legs. The reduced portion of the adjustment pin is freely movable in openings in both of the connecting adjustment legs but securely retains the flexible band when extended by manually adjusting a threaded knob secured to the stem portion of the band adjustment pin.

BRIEF DESCRIPTION OF THE DRAWINGS

FIG. 1 is a perspective view of the operative position of the parts with a supporting upright shown in phantom;

FIG. 2 is a fragmentary, side-elevational view of the platform showing the adjustment leg in the operating position of FIG. 1;

FIG. 3 is a fragmentary, side-elevational view of the platform of FIG. 2 showing the adjustment legs in collapsed position;

FIG. 4 is a fragmentary, longitudinal sectional view of the strap adjustment components of the present invention; and FIG. 5 is a fragmentary view, partially in section, illustrating the operating components of the guide bracket of this invention.

DETAILED DESCRIPTION OF THE DRAWINGS

FIGS. 1, 2 and 3 illustrate a tree stand including a supporting platform 10 disposed in a substantially horizontal plane relative to an upright member 11, which member 11 may be a tree trunk or utility pole. Platform 10 is preferably provided with notch 14 in a "V" configuration defining diverging sides 15. A rubber extrusion 18 covering the marginal edges of the diverging sides 15 of the notch 14. Thus, the marginal edges of the sides 15 permit the notch 14 to grip the upright member 11 and minimize damage to the surface of the upright member, and in particular, the bark of a tree. The platform 10 is intended to support hunters, photographers and naturalists as a means of providing a relatively high viewing position.

The tree stand further includes a flexible metal band 20 preferably of a perforated steel ribbon for surrounding and grasping the trunk of a tree or other upright member 11 on the side opposite the platform notch 14. The band 20 encircles the upright member 11 to force couple, and thereby drive the platform notch 14 against the upright member 11 to clamp the platform 10 against the upright. The part of the band 20 engaging the upright member 11 is preferably provided with an extruded rubber sleeve 21 to avoid damage to the upright member 11. The flexible metal band 20 is provided with a plurality of apertures or perforations 22 longitudinally spaced from one another and extending rearwardly of the opposed distal ends of the band 20, as required, to provide adjustment of the bank relative to an upright 11, as will hereinafter be described. Additional support means is provided in the form of a stabilizing strap and buckle combination 24 disclosed and claimed in U.S. Pat. No. 4,722,421 granted to the present assignee on Feb. 2, 1988.

Adjustable support means are provided at opposite sides of the platform 10. Each of the opposed support means includes a front leg 25 and a rear leg 26. Both legs 25, 26 are preferably made of flexible steel so that the upper end of each leg can flex inwardly or outwardly to adapt to the size of the upright support 11 or for other conditions affecting the attachment of the platform 10 to the upright member 11. Relatively soft rubber bumpers 27 are received and longitudinally movable on the front legs 25 to provide silencing means preventing direct contact of the legs 25 with respective end of band 20. The lower end of each front leg 25 is preferably pivotally attached to a stationary bracket 28 fastened by means of bolts 29 to the platform 10. A supporting pivot in the form of a bolt 30 is provided for supporting the leg 25.

The pivot bolt 30 cooperates with slidable support means for the rear leg 26 to permit both sets of legs 25, 26 to be collapsed for transportation to and from the installation on an upright support member (See FIG. 3). The sliding support of this invention permits detachable securement of the legs 25 and 26, and other components to be later described, in this collapsed position, thereby minimizing rattling and movement of the various components while the unit is being carried and during and after assembly. The preferred embodiment provides an "L" shaped slide bracket 35 secured to the platform 10 by means of bolt and nut assemblies 36 engaging the base 37 of the bracket 35. The integral upstanding side 39 of the bracket 35 defines an elongate slot 40 having latching enlargements 41 (See FIG. 3) and 42 (See FIG. 2) at oppositely disposed front and rear ends of the slots 40.

With attention being directed to the lower end of the rear leg 26, it will be apparent from FIG. 3 that in the closed or collapsed position, the lower end portion of the leg 26 is normally retained in the rear enlargement 42 of the slot 40 and detachably latched in place by means of a releasable slide locking pin 45. The cylindrical pin 45 (see FIG. 5) is recessed to define an annular groove 47 located intermediate its ends. The pin 45 is slidably received in an aperture 48 at the lower end of the rear leg 26 and normally disposed with the flange 46 bearing against a plastic washer 49. A bearing washer 50 is disposed at the opposite side of the upright portion 39 of the slide bracket 35. The front enlargement 41 of the slot 40 of the upright portion 39 also slidably receives the pin 45. Therefore the bearing washer 50 must be of a larger diameter than the diameter of the enlargements 41 and 42 to bear against the wall of the upright portion 39 for retention of the components. The diameter of the reduced portion or groove 47 of the pin 45 is of a dimension permitting slidable and pivotal reception within the marginal edges defining the elongate groove 40 of the bracket 35. Slide pin 45 is prevented from sliding in the slot 40 until the pin 45 is manually moved longitudinally against the base of a compression spring 51. The opposite end of the compression spring 51 bears against a metal washer 52, which in turn is retained by a roll pin or cotter pin 53 received in an aperture disposed transversely relative to the cylindrical pin 45.

Another aspect of the present invention relates to the improved strap adjustment means comprising a strap adjustment mechanism 55 (see details disclosed in FIG. 4) for the oppositely disposed legs 25, 26. The mechanism 55 comprises a cylindrical bushing 56 having an integral flange 57 and being recessed to provide an intermediate groove 59 for receiving a retaining snaping-ring 58. The bushing 56 is received in an extruded guide bracket 60. The snap-ring 58 bears against a plastic washer 61, which in turn abuts the rear leg 26. There is an intermediate plastic washer 62 disposed between the rear leg 26 and the guide brackets 60.

The guide bracket 60 is provided with an open-sided longitudinal groove 63 further defining a coextensive slot 64 and being apertured to pivotally receive the front leg 25 abutting the flange 57 on the bushing 56. An additional longitudinal, coextensive slot 65 is provided for slidable receipt of the clamping band 20.

The bushing 56 is provided with a bore 69 having an enlarged threaded portion 68 for receiving a forward threaded portion 70 located on an axially movable stem 67. The opposite end of the stem 67 is threaded at 71 for receiving a molded knob 72. The forward end 73 of the stem 67 is arranged to be received by a selected aperture 22 of the clamping band 20.

Operation of the tree stand will next be discussed with particular attention to the views of FIGS. 2 and 3, and of the detail views of FIGS. 4 and 5. As shown in FIG. 3, the legs 25 and 26 are disclosed in the collapsed or transporting position relative to the platform 10. When it is desired to locate and affix the tree stand platform 10 to an upright 11 for elevated support for observation, photography or hunting, the knob 72 of the guide bracket 60 is unscrewed to axially move the pin 67 from the position shown in FIG. 4 to disengage the end portion 73 from the aperture 22 of the strap 20. This action permits the strap 20 to slide freely in its slot 65. If desired, the same action may take place in the opposite set of legs 25 and 26 where both ends of the strap 20 are to be adjusted. Often, however, it is desired to retain the strap in its respective guide brackets 60 until final adjustment relative to the upright 11.

The legs 25 and 26 are raised to the support position shown in FIG. 2 by manual pressure applied against the outer end of the slide locking pin 45 and in an axial leftward direction relative to the view of FIG. 5. Sufficient force is required to overcome the bias of the compression spring 51. This axial movement will cause the grooved portion 47 of the pin 45 to be moved axially relative to the slot enlargement 42 for slidable engagement of the elongated slot 40. The legs 25 and 26 may then be raised to the position shown in FIG. 2, with the pin 45 being moved to the left with respect to FIG. 2 to finally engage the enlargement 41, and thereby detachably lock the enlarged portion of the pin 45 within the confines of the enlargement 41 of the slot 40. The front leg 25 will have been pivoted on its pivot member 30 to be raised to the position of FIG. 2. It is also to be noted that the bushing 56 will also have acted as a pivot support for the front and rear legs 25 and 26, respectively, intermediate their ends.

The supporting strap 20 and the stabilizing strap 24 may then be positioned in place, as is well known from the teachings of the previously mentioned U.S. Pat. No. 4,722,421, with the protective rubber sleeve 21 on the band 20 encircling the rear of the upright 11, and with the notched area 14 of the platform 10 bearing against the front of the upright 11. The flexible strap 20 is then adjusted in one or both of the respective guide brackets 60 at either side of the platform 10 until the desired aperture 22 of the strap 20 has been positioned in a preferred location relative to the projecting end 73 of the pin 67. The pin 67 is then locked in place with respect to that aperture 22 by threading rotation of the knob 72. The stabilizing member 24 may thus then be placed in clamping position relative to the upright, as disclosed and claimed in U.S. Pat. No. 4,722,421.

What we claim is:

1. A tree stand including a platform with a notch formed at the rear of the platform and adapted to receive an upright member;

a flexible metal band adapted to embrace the upright member and having a plurality of longitudinally spaced apertures disposed inwardly of the opposed ends of the band;

adjustable support means on each side of the platform including a pair of legs pivotally joined with one another at a respective intermediate end and having their respective opposite ends pivotally connected with the platform, the platform pivot connection of at least one leg of each pair of legs being alternatively movable with respect to the front and the rear of the platform, said movable pivot connection comprising a slide rail bracket anchored to said platform and defining an elongate slot, a pivot pin supported by the said one leg of said pair of legs and adapted to be slidably received by said slot; and releasable latch means for securing the pivot connection in either of said alternative positions with respect to the platform, and wherein the said elongate slot includes a relatively narrow longitudinal opening defined by substantially parallel sides, said longitudinal opening terminating at at least one end in an enlarged slot opening, said pivot pin including a groove slidably received in said longitudinal opening and an enlarged cross-sectional area adjacent said groove and configured for releasable seating engagement in the enlarged slot opening, biasing means normally urging said pivot pin in an axial direction for seating in said enlarged slot opening, and said releasable latch means including manually operable means for releasing said enlarged cross-sectional area of said pin from said enlarged slot opening against the bias of said biasing means to permit longitudinal sliding engagement of said groove in said longitudinal opening.

2. The tree stand of claim 1, wherein the elongate slot terminates at opposite ends in enlarged openings for receiving the enlarged cross-sectional area of the pivot pin, and wherein the movable pivot connection and its releasable latch means secure the pivot connection at both the front and rear positions of said one leg with respect to the platform.

3. The tree stand of claim 1, wherein the pivot connection for the intermediate ends of the respective legs of said pair of legs comprises a pivot pin having a hollow bore including a threaded portion, the pivot pin of said intermediate ends simultaneously supporting both legs of said pair and a retainer for receiving and supporting said flexible band, an axially movable stem containing a threated portion for engaging the threaded portion of said bore, a protruding and portion of said stem being adapted for entry and receipt of a selected aperture of said metal band and means for moving said stem and its end portion in an axial direction for engagement with and removal from said aperture for adjustment of said band with respect to said platform.

4. The tree stand of claim 1 further including noise minimizing means comprising a block of resilient material slidably supported on one of said pair of legs and adapted for movement to a position lying between the said one leg and a juxtaposed distal end portion on the flexible metal band to prevent the band portion of the leg from noisily rubbing against one another.

* * * * *